United States Patent [19]

Lewis, Jr.

[11] Patent Number: 4,604,645
[45] Date of Patent: Aug. 5, 1986

[54] COARSE/FINE AUTOMATIC CHROMINANCE GAIN CONTROL USING A GAIN ADJUSTABLE IF AMPLIFIER IN A DIGITAL TELEVISION RECEIVER

[75] Inventor: Henry G. Lewis, Jr., Trenton, N.J.

[73] Assignee: RCA Corporation, Princeton, N.J.

[21] Appl. No.: 537,814

[22] Filed: Sep. 30, 1983

[51] Int. Cl.$^4$ .................. H04N 9/64; H04N 9/77; H04N 5/52

[52] U.S. Cl. .................................. 358/27; 358/40; 358/174

[58] Field of Search ............... 358/27, 40, 174, 169, 358/13, 38; 328/168; 364/157, 182

[56] References Cited

U.S. PATENT DOCUMENTS

| 2,795,643 | 6/1957 | Lockhart | 358/16 |
| 2,921,120 | 1/1960 | Pritchard et al. | 178/5.4 |
| 3,699,325 | 10/1972 | Montgomery, Jr. et al. | 235/154 |
| 3,806,864 | 4/1974 | Broding et al. | 340/15.5 TS |
| 3,947,806 | 3/1976 | Corkhill et al. | 340/15.5 GC |
| 3,981,006 | 9/1976 | Takayama et al. | 340/347 |
| 4,191,995 | 3/1980 | Farrow | 364/113 |
| 4,237,476 | 12/1980 | Hanma et al. | 358/38 |
| 4,245,353 | 1/1981 | Bynum | 455/234 |
| 4,283,693 | 8/1981 | Saenz | 333/18 |
| 4,360,787 | 11/1982 | Galpin | 330/284 |
| 4,366,498 | 12/1982 | Theriault | 358/38 |
| 4,434,439 | 2/1984 | Steckler et al. | 358/174 |
| 4,447,826 | 5/1984 | Lewis, Jr. et al. | 358/27 |
| 4,466,015 | 8/1984 | Wargo et al. | 358/27 |

FOREIGN PATENT DOCUMENTS 2035732A 6/1980 United Kingdom.

Primary Examiner—James J. Groody
Assistant Examiner—Michael P. Dunnam
Attorney, Agent, or Firm—E. M. Whitacre; P. J. Rasmussen; C. A. Berard, Jr.

[57] ABSTRACT

In a television receiver having digital signal processing, an automatic chrominance gain control apparatus employs a combination of analog gain control and digital gain control stages. Specifically, the analog gain control stage provides a range of fine gain control by altering the frequency response characteristic of the intermediate frequency (IF) amplifier circuits. This is sometimes referred to as "IF tilt" control. The digital gain control stage provides coarse gain control in predetermined increments using a shifter in the digital signal processing circuits. The total gain required is calculated and is apportioned between the coarse and fine gain control stages by a microprocessor.

20 Claims, 6 Drawing Figures

COARSE/FINE AUTOMATIC CHROMINANCE GAIN CONTROL USING A GAIN ADJUSTABLE IF AMPLIFIER IN A DIGITAL TELEVISION RECEIVER

The present invention relates to arrangements for controlling the levels of chrominance signals in television receivers having digital signal processing.

In a television (TV) receiver having analog signal processing of baseband TV signals, the levels of the chrominance signals are controlled so as to accurately portray the color intensity of a displayed picture, and to adjust the color intensity according to viewer preference. To that end, an automatic chroma control (ACC) circuit adjusts the gain of the chrominance signal processing circuitry so that the amplitude of a color reference burst signal component of the baseband TV signal is standardized in the receiver. If the color reference burst signal is so weak that satisfactory color portrayal will not likely result even with further increase of gain, a "color killer" within the ACC suppresses the chrominance signals so that a black-and-white picture results. In addition, attenuation or amplification of the chrominance signals is provided according to the settings of viewer color controls, such as the saturation (SAT) and picture (PIX) controls in the RCA Colortrak (TM) system. In addition, the peak excursions of the chrominance signals are detected by a chroma overload detector (COD) to reduce chrominance channel gain to avoid over-saturated colors.

In a TV receiver having digital signal processing of baseband TV signals, it is necessary that the chrominance processing functions described above be performed by digital circuitry. While plural gain control elements are realized with relative simplicity by the plural analog amplifiers employed in analog processing circuitry, an analogous digital embodiment would require employing plural digital multipliers as gain control devices. This is impractical because digital multipliers are very complex and require thousands of transistors, and so occupy a very large area of a digital integrated circuit chip thereby undesirably increasing the size, cost and power consumption of the integrated circuit.

One approach to reducing the number of digital multipliers is set forth in U.S. Pat. No. 4,447,876 entitled Digital Television Receiver Automatic Chroma Control System. FIG. 1 thereof shows a digital video processing section of a TV receiver including digital gain control provided in coarse (6 dB) increments by digital shifters and in finer increments by a digital multiplier including an adder and a random access memory (RAM) controlled by a micro-processor. While that apparatus provides significant advantage, further advantage would result if use of a digital multiplier could be completely avoided. Moreover, greater advantage will obtain if the improvement is such that existing circuitry of the TV receiver is used to provide the fine gain control.

Accordingly, the present invention comprises an analog filter for adjusting the amplitude of a chrominance component of an analog video signal in response to a first gain control signal. Digital video samples produced from the analog video signals by an analog-to-digital converter are modified in predetermined coarse increments by a digital shifter in response to a second gain control signal. The first and second gain control signals are developed by a control device in response to at least the chrominance component of the digital video samples.

Figure 1:
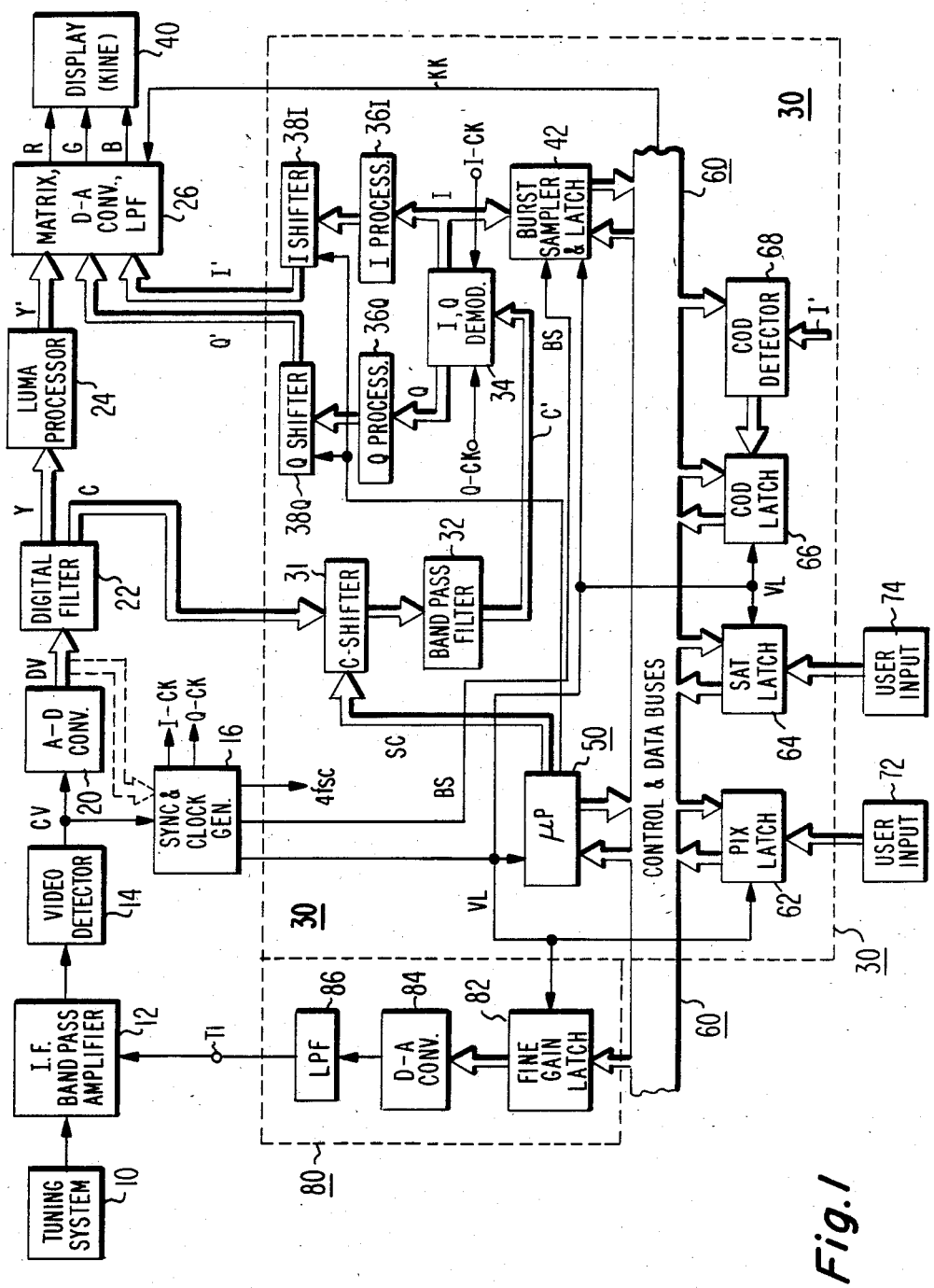
FIG. 1 is a schematic diagram in block diagram form of a television receiver including an embodiment of the present invention.

In the drawing, broad arrows represent signal paths for multiple-bit parallel digital signals and line arrows represent signal paths for analog signals or single-bit or serial digital signals. Unless specified otherwise, it is preferred that digitized video signals be eight-bit parallel digital signals. As used herein, digital shifters or shift registers provide bit position shifting equivalent to multiplication by one-half (division by two) for each bit position shift rightward and equivalent to multiplication by two (division by one-half) for each bit position shift leftward. This process is also expressed as an amplitude or magnitude change by a factor $2^N$ where N is an integer (i.e. the positive and negative numbers 1, 2, 3, 4, .. . and zero). In addition, digital shifters encompass fixed shift and add arrangements providing a gain of, for example, $1 + \frac{1}{2} = 1.5$. Gain changes by factors of 1.5 are referred to as 3.5 dB increments and by factors of 2 are referred to as 6 dB increments.

In the television receiver of FIG. 1, analog video signals at the intermediate frequency from tuning system 10 are received and amplified by IF processor 12 which includes frequency response shaping networks providing, for example, a bandpass characteristic. IF signals from processor 12 are detected to produce baseband composite analog video signals CV by video detector 14.

For digital signal processing, analog composite video signals CV are converted into corresponding eight-bit digital video samples DV by analog-to-digital converter (ADC) 20. ADC 20 produces digital video samples DV at a rate of four times the color subcarrier frequency in response to a $4f_{sc}$ sampling clock provided by clock generator 16. Clock signals I-CK and Q-CK are provided at, for example, either one or two times the color subcarrier frequency and at phases with respect to the color reference burst signal so as to correspond in phase to the I and Q quadrature color components of the chrominance signals. Generator 16 further provides color burst sample signal BS and vertical interval latching signal VL described below, as well as, for example, horizontal and vertical and synchronization signals. It is satisfactory that clock generator 16 be responsive to synchronization and color subcarrier reference components of analog composite video signals CV or to corresponding components of digital video samples DV (as indicated by the broad arrow shown in phantom).

Digital comb filter 22 receives digital video samples DV and separates them into digital luminance Y and digital chrominance C component signal samples. Luminance processor 24 provides, for example, filtering, peaking and noise reduction of luminance samples Y to develop and apply processed luminance samples Y' to matrix 26. Matrix 26 receives the luminance samples Y' and chrominance component samples I', Q' and includes digital-to-analog converters (DAC) for developing analog color video signals R,G,B which are applied to kinescope 40 to display the TV picture thereon. Signals R,G,B are low pass filtered either by an analog filter, e.g. a resistor and a capacitor, or by the holding action of the DACs. Matrixing from the Y,I,Q components to the R,G,B components can employ either a digital matrix or an analog matrix to provide the matrix transformation in accordance with the NTSC system standards, for example, in the United States; three DACs are required either to process digital R,G,B signals developed by the digital matrix or to develop analog Y,I,Q signals for the analog matrix.

Digital chrominance samples C from filter 22 are processed to develop chrominance component samples, I',Q' by digital chrominance processor 30. Because comb filter 22 includes an adder, it produces nine-bit output signals. It is preferred that the full nine-bit chrominance signal C be applied to processor 30. Processor 30 includes digital shifters 31, 38Q and 38I for providing coarse gain adjustments for the digital chrominance samples in predetermined increments, for example, in 6 dB increments. These shifters cooperate with IF processor 12 which provides, for example, up to 6 dB of gain adjustment in very fine steps so that any gain value within the entire range of gain adjustment can be achieved to within the fine gain accuracy.

The range of gain adjustment required in the chrominance signal path is from +24 dB amplification to −24 dB attenuation for a TV receiver in which the color killer threshold is −24 dB with respect to nominal color burst signal level and in which the burst level is no greater than +6 dB with respect to nominal. This range permits 18 dB of viewer-preference PIX correction within the ACC control loop. In addition, up to 6 dB of attenuation is provided for chrominance overload correction to compensate for the error condition which can occur when the transmitted color reference burst signal is up to 6 dB below nominal with respect to the transmitted chrominance signals. These gain ranges and requirements are summarized in TABLE I.

TABLE I

| | GAIN REQUIREMENTS | |
|---|---|---|
| Function | Gain Range (Value) | Gain Range (dB) |
| PIX | 1 to $\frac{1}{8}$ | 0 to −18 |
| SAT | 2 to $\frac{1}{4}$ | +6 to −12 |
| ACC | 8 to $\frac{1}{2}$ | +18 to −6 |
| COD | 1 to $\frac{1}{2}$ | 0 to −6 |

Substantially continuous gain adjustment is provided so long as the range of fine-gain adjustment contributed by IF processor 12 substantially equals or exceeds the coarse gain adjustment increment provided by digital chrominance processor 30.

In the following description, the operation of digital chrominance processor 30 is described first and the operation of micro-processor 50 thereafter.

Digital chrominance processor 30 includes chrominance shifter 31 which provides, for example, 0 dB, 6 dB or +12 dB of coarse gain adjustment to chrominance samples C in accordance with two-bit shifter control signals SC developed by micro-processor 50. The chrominance samples C are then filtered by bandpass digital filter 32 which has a bandpass frequency response characteristic which includes the frequencies of the color subcarrier and its sidebands. Filtered digital chrominance samples C' are demodulated into respective I and Q digital chrominance component samples by I,Q demodulator 34 in response to quadrature sampling clock signals I-CK and Q-CK, respectively.

The I and Q component samples are processed by processors 36I and 36Q, respectively, which processing can include, for example, tint adjustments, fleshtone corrections, filtering and noise reduction. Thereafter, additional coarse gain adjustment is provided by I shifter 38I and by Q shifter 36Q to produce the I' and Q' digital chrominance samples, respectively. Shifters 38I and 38Q provide equal coarse gain adjustments of −24 dB, −18 dB, −12 dB, −6 dB, 0 dB, +6 dB or +12 dB in response to a shifter control signal from micro-processor 50. Thus, shifters 31, 38I and 38Q cooperate in response to micro-processor 50 to provide chrominance digital coarse gain adjustment from −24 dB to +24 dB in coarse increments of 6 dB.

The remaining gain adjustment, that of a fine gain adjustment over a range of up to approximately 6 dB, is provided by fine gain control converter 80 and IF processor 12. IF processor 12 includes a bandpass filter circuit having a frequency response characteristic, such as that shown in FIG. 2, controllable in response to a fine gain control signal. The frequency response characteristic is controllably changed in frequency with respect to the chrominance subcarrier intermediate frequency of 42.17 MHz and the picture subcarrier intermediate frequency of 45.75 MHz, in the NTSC system. When the fine gain control signal at terminal T1 is such that IF processor 12 exhibits characteristic 110, substantially no attenuation of the chrominance signals occurs. When the control signal at T1 produces characteristic 112, about 3 dB of attenuation is provided; when it produces characteristic 114, about 6 dB of attenuation is provided.

Fine gain control converter 80 of FIG. 1 includes fine gain latch 82 which stores the digital word produced by micro-processor 50 representing the fine gain adjustment value. That latched digital value is converted into an analog level by digital-to-analog converter 84 and is applied via lowpass filter 86 and terminal T1 to IF processor 12 to control the frequency response thereof as described above. A five-bit gain control word provides a fine gain resolution of about 2.2%, which is satisfactory.

Micro-processor 50 is coupled to various devices by control and data busses 60 for transmitting and receiving control and data signals, as set forth in Table II below.

TABLE II

| | CONTROL & DATA BUS FUNCTIONS | | |
|---|---|---|---|
| Unit | μP MODE | CONTROL BUS | DATA BUS |
| Burst Latch 42 | Send | Transmit Enable | — |
| | Receive | — | Latched Burst Value |
| PIX Latch 42 | Send | Transmit Enable | — |
| | Receive | — | Latched PIX Value |
| SAT Latch 64 | Send | Transmit Enable | — |
| | Receive | — | Latched SAT Value |
| COD Latch 66 | Send | Transmit Enable | — |
| | Receive | — | Latched COD Value |
| COD Detector 68 | Send | Receive Enable | COD Reference Value |
| | Receive | — | — |
| COD Latch 66 | Send | Transmit Enable | — |
| | Receive | — | COD Value |
| Fine Gain | Send | Receive Enable | Fine Gain |

TABLE II-continued

| Unit | μP MODE | CONTROL BUS | DATA BUS |
|---|---|---|---|
| Latch 82 | Receive | — | Value — |

Burst sampler and latch 42 stores the value of digital I samples occurring at predetermined times during the color reference burst signal in response to burst sample signal BS developed by clock generator 16. Preferably, burst sampler and latch 42 samples a plurality of burst samples each field and developes an average thereof in which case burst sample signal BS includes a plurality of appropriately timed sampling pulses. For example, it is convenient to sample the color burst signals four times for each of 128 lines in a TV field because the division operation required for obtaining the average value is merely a shifting operation. Burst latch 42 latches the average value of the burst samples in response to latching signal VL which is developed by clock generator 16 during the vertical blanking interval, for example. The stored burst average value from burst latch 42 is transmitted to micro-processor 50 via data bus 60.

Viewer preferred settings of PIX and SAT levels are applied to PIX latch 62 and SAT latch 64 from viewer input sources 72 and 74, respectively. Latches 62 and 64 latch the preferred values in response to latch signal VL and transmit them to micro-processor 50 via data bus 60.

Chroma overload detector (COD) 68 receives a COD reference level from micro-processor 50 via data bus 60. Processed digital chroma component samples I' are compared against the COD reference level by detector 68. The number of occurrences in which the former exceeds the latter is accumulated by detector 68 and is stored in COD latch 66 in response to latching signal VL and is transmitted to micro-processor 50 via data bus 60.

Figure 3:
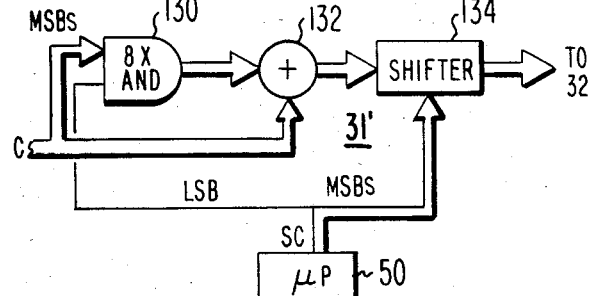

In order to more closely control the group delay error introduced by the bandpass filter of IF processor 12, it is preferred that IF processor 12 is modified (or the control voltage level at terminal T1 is restricted) so that only about 4 dB of gain variation is provided thereby. To compensate for the reduction of the gain adjustment provided by IF processor 12 from 6 dB to 4 dB, shifter 31' shown in FIG. 3 is substituted for shifter 31 of FIG. 1. If the fine-gain control word remains at five-bits, the fine gain adjustment resolution decreases to about 1.4%.

Shifter 31' includes shifter 134 to provide gain adjustments in 6 dB increments and includes AND gate 130 and adder 132 to provide a gain adjustment of 3.5 dB. AND gate 130 selectively applies the eight most significant bits (MSB) of nine-bit chrominance signals C to adder 132 in response to the least significant bit (LSB) of the three-bit shifter control signal provided by microprocessor 50 being logically true and otherwise applies a zero signal to adder 132. Chrominance signals C are applied to adder 132 which develops a ten-bit sum signal which is either 1×C or 1.5×C in accordance with the LSB of the shifter control signal, thereby providing a gain adjustment of either 0 dB or 3.5 dB, respectively. Shifter 134 then selects groups of eight bits of the ten-bit sum signal in response to the remaining bits (MSBs) of the shift control signal to provide gain adjustments in 6 dB increments. Shifter 31' thus provides gain adjustments of 0 dB, +3.5 dB, +6 dB, +9.5 dB, +12 dB, and +15.5 dB.

Figure 4:
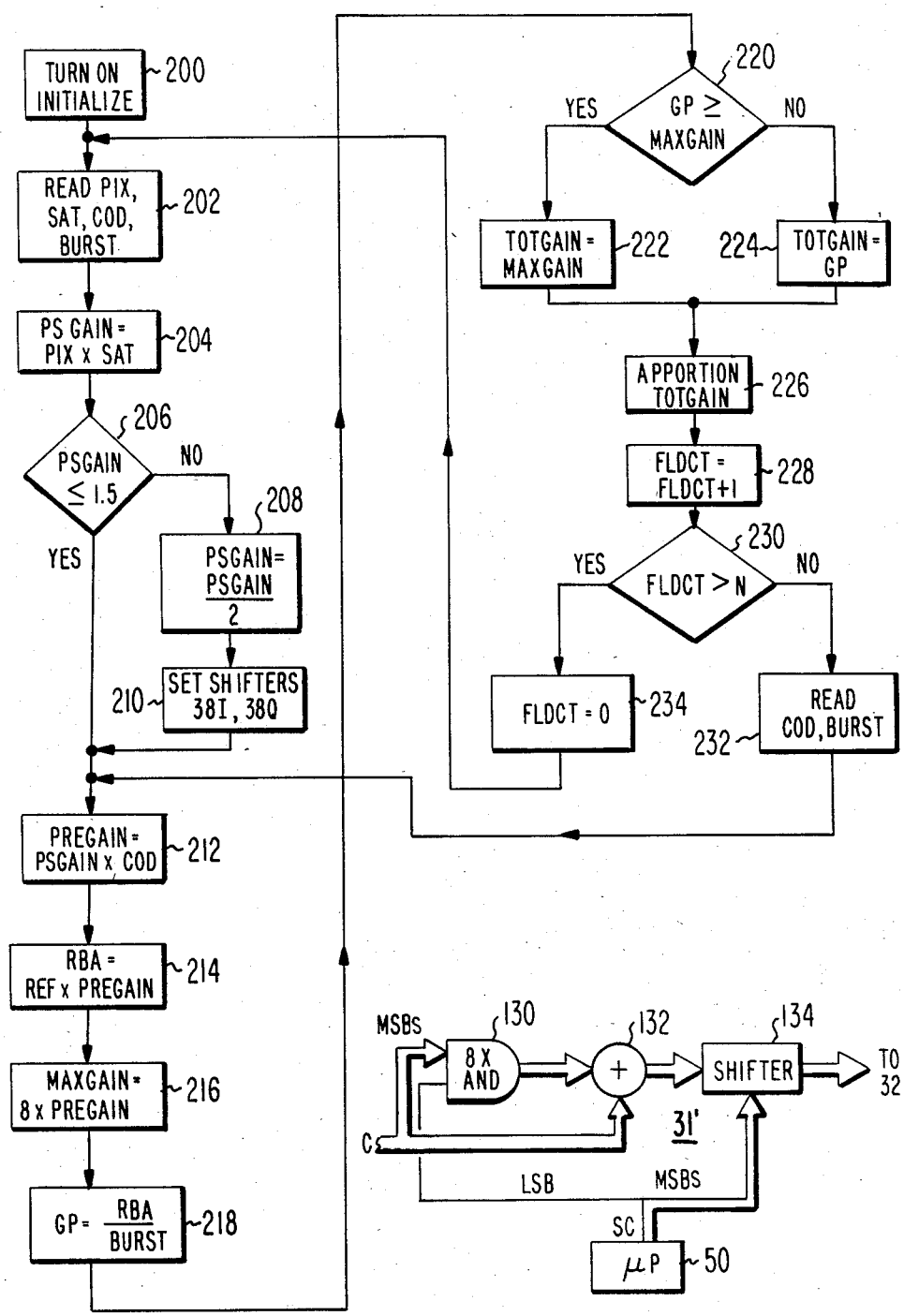
FIG. 4 is a flow diagram useful in understanding the operation of the TV receiver of FIG. 1.

Microprocessor 50 computes the total gain required in the chrominance signal path and apportions that gain among IF processor 12, shifter 31', and shifters 38I, 38Q in accordance with the flow chart shown in FIG. 4. In the following description, the reference numerals of boxes in FIG. 4 representing operations are used immediately following the word describing that operation.

Upon turning the receiver on, all values are initialized 200 to values producing an overall chrominance signal path gain TOTGAIN of unity which corresponds to a nominal operating condition. Then, the viewer-controlled preference levels of saturation SAT and picture PIX and the operating values of burst amplitude BURST and chrominance overload COD are read 202 from latches 72, 62, 42 and 66, respectively2. Next, the partial gain product PSGAIN is calculated 204 from the values of PIX and SAT and is compared 206 to a threshold level. If the value of PSGAIN is greater than 1.5, then the value of PSGAIN is divided 208 by two and shifters 38I and 38Q are set 210 to provide +6 dB gain.

Thereafter, or if the original value of PSGAIN was less than or equal to 1.5, a preliminary gain product PREGAIN is calculated 212 from PSGAIN and COD. A required chrominance subcarrier reference burst value RBA is calculated 214 from the nominal burst amplitude REF (e.g. 40 IRE units) and the PREGAIN value. In addition, a maximum allowable gain value MAXGAIN is calculated 216 to be eight times the PREGAIN value, and the gain product GP required to achieve the proper reference burst amplitude (including viewer preference control values) is calculated 218 from the required value RBA and the measured value BURST.

A comparison 220 determines whether the gain product GP exceeds or equals the maximum gain value MAXGAIN and, if so, sets 222 the overall chrominance signal path gain TOTGAIN to MAXGAIN. If not, TOTGAIN is set 224 to the value GP. Then TOTGAIN is apportioned 226 between IF processor 12, C-shifter 31 and I and Q shifters 38I, 38Q, according to TABLES III and IV.

TABLE III

GAIN APPORTIONMENT, PSGAIN ≦ 1.5

| GP Range | Shifter 31' | Shifters 38I, 38Q | Total (Coarse) |
|---|---|---|---|
| 12 to 16* | +12 dB | +12 dB | +24 dB |
| 8 to 12* | +15.5 dB | +6 dB | +21.5 dB |
| 6 to 8 | +12 dB | +6 dB | +18 dB |
| 4 to 6 | +15.5 dB | 0 dB | +15.5 dB |
| 3 to 4 | +12 dB | 0 dB | +12 dB |
| 2 to 3 | +9.5 dB | 0 dB | +9.5 dB |
| 1.5 to 2 | +6 dB | 0 dB | +6 dB |
| 1 to 1.5 | +3.5 dB | 0 dB | +3.5 dB |
| 0.75 to 1 | 0 dB | 0 dB | 0 dB |
| 0.5 to 0.75 | +3.5 dB | −6 dB | −2.5 dB |
| 0.33 to 0.5 | 0 dB | −6 dB | −6 dB |
| 0.25 to 0.33 | +3.5 dB | −12 dB | −8.5 dB |
| 0.165 to 0.25 | 0 dB | −12 dB | −12 dB |
| 0.125 to 0.165 | +3.5 dB | −18 dB | −14.5 dB |
| 0.099 to 0.125 | 0 dB | −18 dB | −18 dB |
| 0.062 to 0.099 | +3.5 dB | −24 dB | −20.5 dB |
| <0.062 | 0 dB | −24 dB | −24 dB |

Table entries marked with an asterisk (*) are those levels of GP for which the result of comparison operation 220 could be either YES or NO, however, a result of NO is assumed in the tables. It is noted that total gain values between those listed in the right-hand column are apportioned to be provided by IF processor 12 and controlled by the signal at terminal T1.

TABLE IV

| GAIN APPORTIONMENT, PSGAIN > 1.5 | | | |
|---|---|---|---|
| GP Range | Shifter 31' | Shifters 38I, 38Q | Total (Coarse) |
| 1.5 to 2 | 0 dB | +6 dB | +6 dB |
| 2 to 3 | +3.5 dB | +6 dB | +9.5 dB |
| 3 to 4 | +6 dB | +6 dB | +12 dB |
| 4 to 6 | +9.5 dB | +6 dB | +15.5 dB |
| 6 to 8 | +12 dB | +6 dB | +18 dB |
| 8 to 12* | +15.5 dB | +6 dB | +21.5 dB |
| 12 to 16* | +12 dB | +12 dB | +24 dB |

Operations 228 through 234 reduce calculation time by performing a calculation of PSGAIN less frequently than for every field. The field count FLDCT is incremented 228 by one each field and is compared 230 to a number N representing the number of fields for which a PSGAIN calculation is not performed. N=4 is a satisfactory number. If the comparison 230 result is YES, then FLDCT is reset 234 to zero and the calculation cycle loops back to begin anew at read operation 202, thereby to recalculate a new value of PSGAIN. If the comparison 230 result is NO, the values COD and BURST are read 232 and the calculation cycle loops back to calculation operation 212. It is preferred that the calculation loop complete a gain calculation and apportionment cycle within the time corresponding to one field, and that the read operations 202 and 232, the setting operation 210 and the gain apportionment operation 226 be performed during the vertical blanking interval.

Figure 5:
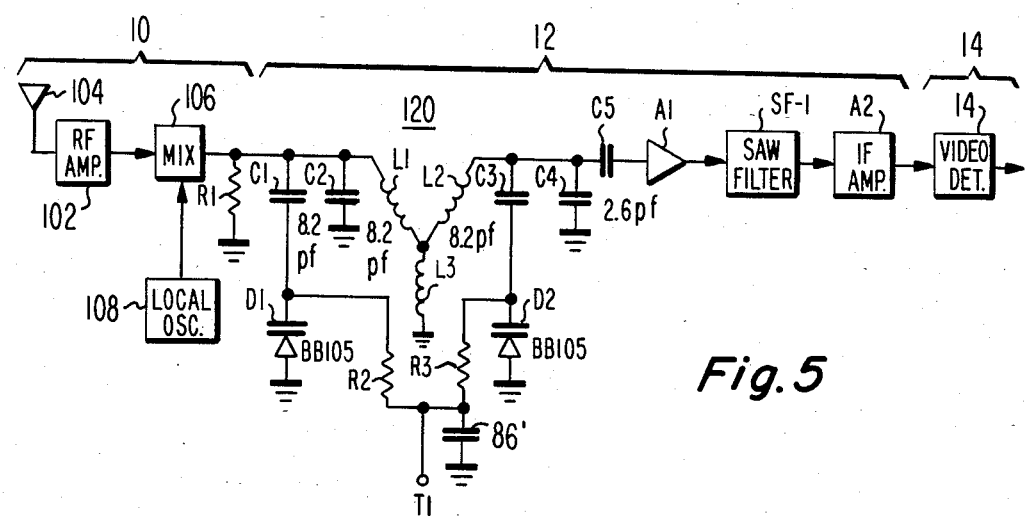
FIGS. 3, 5 and 6 are schematic diagrams of apparatus suitably employed in the TV receiver of FIG. 1.

In FIG. 5, tuning system 10 includes an RF amplifier 102 coupling RF signals from antenna 104 to mixer 106 in which the RF signals are heterodyned with signals from local oscillator 108 to produce the IF signals applied to load resistor R1 and to IF processor 12. IF processor 12 includes a double-tuned bandpass filter circuit 120 which includes two major tuned sections. On the input side, inductors L1 and L3 are tuned in cooperation with capacitor C2 and capacitor C1 in series with varactor diode D1. The capacitance of varactor diode D1 is changed over a range of capacitance values by the control voltage at terminal T1 which is applied via resistor R2. The capacitance of the varactor diode D1 is coupled to the input side of the double-tuned circuit by capacitor C1 which provides D.C. isolation of the tuning voltage from the rest of the tuned circuit and provides a division of the reactive voltage across capacitor C1 and varactor diode D1. The output side of the double-tuned circuit 120 is similarly tuned by inductors L2 and L3 in parallel with capacitor C4 and the series combination of capacitor C3 and varactor diode D2. The control voltage at T1 is applied via resistor R3 to vary the capacitance value of varactor diode D2. The magnitude of the required control voltage range is affected by the values of capacitors C1 and C3. When the capacitances of capacitors C1 and C3 are made larger, a smaller control voltage change is required to tune circuit 120 over its full range. When capacitors C1 and C3 are made smaller, a larger control voltage range is needed to tune circuit 120 over its full range.

Figure 2:
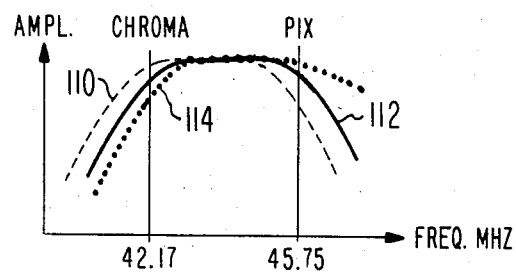
FIG. 2 is an amplitude vs. frequency response characteristic of the apparatus of FIGS. 1 and 4.

When the control voltage generator 80 applies a nominal midrange voltage to terminal T1, double-tuned circuit 120 is tuned so that the response characteristic is substantially as shown by curve 112 in FIG. 2. The chroma carrier is attenuated, for example, by about 2 dB under this condition.

Higher control voltage at T1 increases the resonant frequencies of double-tuned circuit 120, which exhibits the response shown by dotted curve 114 so that the chroma carrier amplitude is decreased by about 4 dB. Lower control voltage at T1 tunes double-tuned circuit 120 to lower resonant frequencies to exhibit a response curve as shown by dashed curve 110 so that the chroma signal carrier is substantially unattenuated.

A moderate amount of passband shaping by double-tuned circuit 120 is sufficient to achieve the desired amplitude correction. In particular, a range of adjustment of about 4 dB is satisfactory for the chroma carrier signals when shifter 31' is employed (it is noted that a 6 dB range of adjustment is satisfactory when 6 dB shifter 31 is employed). It is also acceptable that the chroma and picture carriers be attenuated by about 4 to 5 dB relative to the amplitude at the center of the passband, at the output of SAW filter SF 1. Thus, the cumulative attenuation of these carriers by both the double-tuned circuit 120 and SAW filter SF 1 must be considered in the design of IF section 12 of the receiver. Double-tuned circuit 120 exhibits a favorable group delay characteristic, which tends to offset the unfavorable group delay characteristic of the tuner 10 during periods of chroma carrier signal amplitude variation.

Frequencies above the picture carrier frequency and below the chroma carrier frequency are rolled off at a gradual rate by double-tuned circuit 120 and are rolled off much more sharply by the response characteristics of the SAW filter SF 1. The output side of double-tuned circuit 120 is coupled by capacitor C5 to the input of preamplifier A1. The output of preamplifier A1 is coupled to the input of a surface acoustic wave (SAW) filter SF 1. The output of SAW filter SF 1 is coupled to the input of IF amplifying stage A2. The output of IF amplifying stage A2 is coupled to the input of video detector 14, which produces sound IF signals and baseband video signals at its output. The sound IF signals are applied to an audio frequency signal processing stage (not shown) for the reproduction of audio information by a loudspeaker (not shown). The baseband video signals are applied to A-D converter 20 as described above.

Figure 6:
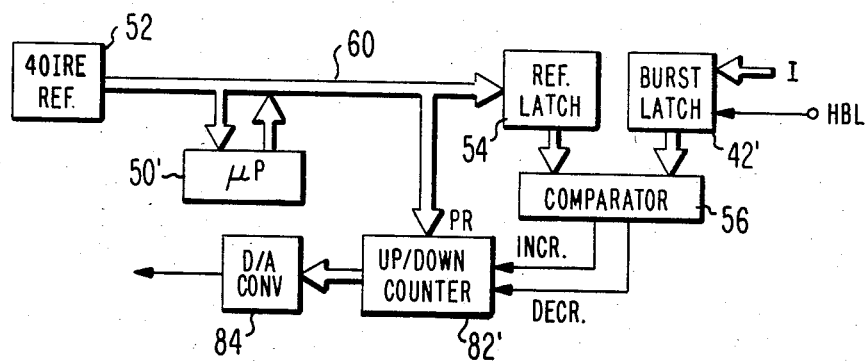

Modifications are contemplated to the present invention which is limited in scope only by the claims following. For example, FIG. 6 is a modification to the apparatus of FIG. 1 providing for modification of the chroma signal path gain at the horizontal line rate. The digital value representing, for example, the nominal 40 IRE unit color burst reference signal amplitude is transmitted to micro-processor 50' which calculates and apportions the gain substantially as described above.

However, instead of applying the fine gain value to fine gain latch 82, micro-processor 50' computes a new value of chroma reference signal amplitude based on the viewer-control 72,74 settings and transmits that value to chroma reference latch 54. In addition, micro-processor 50' transmits an initial fine gain value to preset (PR) up-down counter 82'. Chrominance component samples I sampled by burst sampler and latch 42' are latched each horizontal line in response to horizontal blanking pulse HBL provided by clock generator 16. The latched chroma burst samples, which preferably are averages of plural samples, are compared with the reference level stored in latch 54 by comparator 56.

If the chroma burst amplitude is too high, comparator 56 increments up-down counter 82' by one count and the increased count causes D-A converter 84 to increase the voltage at T1 thereby to change the frequency response characteristic of IF processor 12 to slightly reduce the chroma signal path gain. Conversely, if the burst amplitude is too low, comparator 56 decrements counter 82' by one count to change the frequency response characteristic of IF processor 12 to increase the chroma signal path gain. Accordingly, the chroma burst sample amplitude is controlled to approach the modified reference level calculated by micro-processor 50'. This modified apparatus will be insensitive to noise because the chroma signal path gain is changed at the relatively low rate of only one count each horizontal line, yet it will permit almost $2^8$ gain increments per TV field and so provide more than adequate speed of response for large chrominance level changes.

In addition, it is apparent that other modifications are also satisfactory. For example, sync and clock generator 16 of FIG. 1 can be responsive to digital video signals DV coupled to it by the phantom arrow to generate the various timing and clocking signals described herein. Chrominance demodulation on other color axes, for example, the (R-Y) and (B-Y) axes, rather than on the I and Q axes as described herein, is also satisfactory.

By way of further example, shifters 38I and 38Q can be replaced by a single shifter to which I and Q signals from I and Q processors 36I and 36Q are time multiplexed. The single shifter output is demultiplexed and applied to the I' and Q' inputs of matrix 26. This modification is possible because the I and Q signal data rates are less than the 4fsc clock rate and is convenient because both signals are always shifted equally.

With respect to FIG. 4, calculation reducing steps 228 to 234 can be eliminated in which case the calculation cycle following operation 226 loops back to read operation 202. The calculation loop operations can be performed either more or less often than once per field. Further, the value BURST can be compared to a color killer threshold level by an operation inserted at any convenient location between operations 206 and 220.

Other forms of viewer control, digital color signal processing and the like may also be employed in conjunction with the present invention.

What is claimed is:

1. A chrominance signal processing apparatus for providing a given chrominance gain in a television receiver comprising:
    analog filtering means for providing a frequency response characteristic including the frequency of a chrominance component of an analog composite video signal therein, wherein said frequency response characteristic is controllable in response to a first gain control signal for adjusting the amplitude of said chrominance component in first predetermined increments relative to other components of said analog composite video signal;
    analog-to-digital converting means coupled to said analog filtering means for developing digital video samples corresponding to said analog composite video signals;
    digital shifting means, coupled to said analog-to-digital converting means and responsive to a second gain control signal, for modifying the magnitude of the chrominance component of said digital video samples in second predetermined increments being greater than said first predetermined increments;
    control means, coupled to said digital shifting means and to said analog filtering means and responsive to the chrominance component of said digital video samples, for developing said first and second gain control signals to apportion said given chrominance gain between said analog filtering means and said digital shifting means.

2. The apparatus of claim 1 wherein said analog filtering means includes an analog intermediate frequency (IF) amplifier and IF bandpass filter circuit, said IF bandpass filter circuit providing said frequency response characteristic having a passband controllable in response to said first gain control signal for adjusting the amplitude of said chrominance component by not more than seven decibels relative to other components of said analog composite video signal.

3. The apparatus of claim 2 wherein said IF bandpass filter circuit includes a tuned circuit having a controllable reactance means to which said first gain control signal is applied for controlling said frequency response characteristic having a passband.

4. The apparatus of claim 1 further comprising digital filtering means coupled between said analog-to-digital converting means and said digital shifting means, said digital filtering means for developing filtered samples representing said chrominance component of said digital video samples.

5. The apparatus of claim 4 further comprising second digital filtering means coupled to said digital shifting means for filtering said magnitude-modified chrominance component samples.

6. The apparatus of claim 5 further comprising second digital shifting means coupled to said second digital filtering means and responsive to a third gain control signal for modifying the magnitudes of the filtered samples produced by said second digital filtering means in predetermined increments, said control means for further developing said third gain control signal in conjunction with said first and second gain control signals to apportion said given chrominance gain among said analog filtering means, said digital shifting means and said second digital shifting means.

7. The apparatus of claim 1 wherein said control means comprises:
    sampling means for sampling a reference portion of the chrominance component of said digital video samples;
    a source of chrominance control signals representing a level of said given chrominance gain;
    calculating means responsive to said sampled reference portion of the chrominance component samples and to said chrominance control signals for calculating digital signals representative of said first and second gain control signals corresponding to said given chrominance gain.

8. The apparatus of claim 7 wherein said control means includes means for applying said calculated digital value representative of said second gain control signal to said digital shifting means as a shifting control signal, and further includes digital-to-analog converting means for developing said first gain control signal in response to said calculated digital value representative thereof.

9. The apparatus of claim 1 wherein said digital shifting means modifies the magnitude of said chrominance component samples in said predetermined increments which include a factor of approximately two, and wherein said analog filtering means adjusts the amplitude of said chrominance component over a range of approximately two to one.

10. The apparatus of claim 1 wherein said digital shifting means modifies the magnitude of said chrominance component samples in said predetermined increments which include a factor of approximately one and one-half, and wherein said analog filtering means adjusts the amplitude of said chrominance component over a range of approximately one and one-half to one.

11. In a television receiver including a source of analog composite video signals having a chrominance subcarrier frequency component with a reference burst component, analog-to-digital converting means for developing digital video samples representing said analog composite video signals, and digital signal processing means for processing said digital video samples to produce picture information on a display device, chrominance gain controlling apparatus comprising:

sampling means included in said digital processing means for producing a digital signal representing the reference burst component of said digital video samples;

means for supplying a color control signal representing a level of amplification or attenuation to be applied to the chrominance components of said digital video samples;

coarse gain control means including a digital shifting means coupled to said digital signal processing means for controllably shifting said digital video samples to modify the magnitudes thereof by predetermined increments in response to a first gain control signal;

fine gain control means including analog filtering means coupled to said source for providing a frequency response characteristic controllable to change the amplitude of said chrominance subcarrier frequency component of said analog composite video signals relative to other components of said analog composite video signals by increments smaller than said predetermined increments in response to a second gain control signal; and calculating means responsive to said reference burst representative digital signal and to said color control signal for calculating the total gain required for the chrominance components of said analog composite video signals and of said digital video samples, and for developing said first and second gain control signals to apportion said total gain between said coarse gain control means and said fine gain control means.

12. The apparatus of claim 11 wherein said analog filtering means of said fine gain control means includes an analog intermediate frequency (IF) bandpass filter circuit, said IF bandpass filter circuit providing a frequency response passband controllable in response to said second gain control signal.

13. The apparatus of claim 12 wherein said IF bandpass filter circuit includes a tuned circuit having a controllable reactance means to which said second gain control signal is applied for controlling said frequency response passband.

14. The apparatus of claim 11 further comprising digital filtering means coupled between said analog-to-digital converting means and said coarse gain control means, said digital filtering means for developing filtered samples representing said chrominance component of said digital video samples.

15. The apparatus of claim 14 wherein said coarse gain control means further comprises second digital filtering means coupled to said digital shifting means for filtering said magnitude-modified chrominance component samples.

16. The apparatus of claim 15 wherein said coarse gain control means further comprises second digital shifting means coupled to said second digital filtering means and responsive to a third gain control signal for modifying the magnitudes of the filtered samples produced by said second digital filtering means in predetermined increments, and wherein said calculating means develops said third gain control signal in conjunction with said first and second gain control signals to apportion said total gain among said analog filtering means of said fine gain control means, said first and second digital shifting means of said coarse gain control means.

17. The apparatus of claim 11 wherein said calculating means calculates first and second digital values respectively representing coarse and fine gain portions of said total gain, and includes means for developing said first gain control signal in response to said first calculated digital value, and digital-to-analog converting means for developing said second gain control signal in response to said second calculated digital value.

18. The apparatus of claim 17 wherein said means for developing said first gain control signal includes means for applying said first calculated digital value to said digital shifting means as a shifting control signal.

19. The apparatus of claim 11 wherein said digital shifting means modifies the magnitude of said digital video samples in said predetermined increments which include a factor of approximately two, and wherein said analog filtering means adjusts the amplitude of said chrominance subcarrier frequency component over a range of approximately two to one.

20. The apparatus of claim 11 wherein said digital shifting means modifies the magnitude of said digital video samples in said predetermined increments which include a factor of approximately one and one-half, and wherein said analog filtering means adjusts the amplitude of said chrominance subcarrier frequency component over a range of approximately one and one-half to one.

* * * * *